United States Patent
Demaj et al.

(10) Patent No.: US 9,161,315 B2
(45) Date of Patent: Oct. 13, 2015

(54) WIRELESS TRANSMISSION POWER CONTROL METHOD AND SYSTEM

(75) Inventors: Pierre Demaj, Nice (FR); Fabrizio Tomatis, Vallauris (FR)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 601 days.

(21) Appl. No.: 12/593,569

(22) PCT Filed: Mar. 18, 2008

(86) PCT No.: PCT/IB2008/051019
§ 371 (c)(1),
(2), (4) Date: Jan. 8, 2010

(87) PCT Pub. No.: WO2008/117203
PCT Pub. Date: Oct. 2, 2008

(65) Prior Publication Data
US 2010/0105407 A1    Apr. 29, 2010

(30) Foreign Application Priority Data
Mar. 28, 2007    (EP) .................................... 07105142

(51) Int. Cl.
*H04W 52/12*    (2009.01)
*H04W 52/24*    (2009.01)
*H04W 52/14*    (2009.01)
*H04W 52/34*    (2009.01)

(52) U.S. Cl.
CPC ............ *H04W 52/241* (2013.01); *H04W 52/12* (2013.01); *H04W 52/143* (2013.01); *H04W 52/343* (2013.01)

(58) Field of Classification Search
CPC . H04W 52/241; H04W 52/12; H04W 52/143; H04W 52/343
See application file for complete search history.

(56) References Cited

U.S. PATENT DOCUMENTS

| | | | |
|---|---|---|---|
| 6,370,387 B1 | 4/2002 | Reemtsma | |
| 6,567,670 B1 | 5/2003 | Petersson | |
| 6,718,162 B1 * | 4/2004 | Agin et al. | 455/63.1 |
| 2002/0022487 A1 * | 2/2002 | Ahn | 455/453 |
| 2002/0077138 A1 * | 6/2002 | Bark et al. | 455/522 |
| 2002/0115467 A1 * | 8/2002 | Hamabe | 455/522 |

(Continued)

OTHER PUBLICATIONS

PCT International Search Report With Written Opinion of the International Searching Authority PCT/IB32008/051019, mailing date, Dec. 12, 2008, pp. 9.

*Primary Examiner* — Mehmood B Khan
(74) *Attorney, Agent, or Firm* — Peter J. Meza; Hogan Lovells US LLP (57) ABSTRACT

A wireless communication system includes a primary station which has a transmitter for transmitting wireless signals on a downlink, and a plurality of secondary stations each having a receiver for receiving signals on the downlink and a transmitter for transmitting on an uplink. In a normal, loaded condition a synchronization channel and a data channel are present on the downlink and closed power control is achieved by measuring the signal to interference ratio (SIR) in a received downlink transmission, comparing the measured SIR with a target SIR and sending a power adjust indication on the uplink to cause the primary station to adjust its transmitted power on the downlink. The secondary station monitors the downlink and, in response to detecting an unloaded cell condition, determines a target SIR offset which it applies to the target SIR to overcome interference from the presence of the synchronization channel on the downlink.

21 Claims, 4 Drawing Sheets (56) References Cited

U.S. PATENT DOCUMENTS

| | | | |
|---|---|---|---|
| 2004/0157618 A1* | 8/2004 | Brouwer | 455/453 |
| 2005/0085255 A1 | 4/2005 | Andersson et al. | |
| 2005/0099968 A1 | 5/2005 | Yamano | |
| 2005/0101902 A1 | 5/2005 | Navia et al. | |
| 2005/0243752 A1 | 11/2005 | Brueck et al. | |
| 2005/0277419 A1* | 12/2005 | Takano et al. | 455/442 |
| 2006/0183471 A1* | 8/2006 | Samuel et al. | 455/423 |
| 2006/0217141 A1 | 9/2006 | Legg et al. | |
| 2007/0173279 A1* | 7/2007 | Kuroda et al. | 455/522 |
| 2007/0248035 A1* | 10/2007 | Sang et al. | 370/318 |
| 2008/0049698 A1 | 2/2008 | Kim | |
| 2008/0081655 A1* | 4/2008 | Shin et al. | 455/522 |
| 2008/0220806 A1* | 9/2008 | Shin et al. | 455/522 |
| 2009/0097454 A1* | 4/2009 | Yeou et al. | 370/332 |
| 2009/0305712 A1* | 12/2009 | Franceschini et al. | 455/450 |
| 2013/0035132 A1* | 2/2013 | Shin et al. | 455/522 |

* cited by examiner

WIRELESS TRANSMISSION POWER CONTROL METHOD AND SYSTEM

CROSS-REFERENCE TO RELATED APPLICATIONS

The present application is a national filing in the U.S. Patent & Trademark Office of PCT/IB2008/051019 filed Mar. 18, 2008, and claims priority of European Patent Application No. 07105142.9 filed Mar. 28, 2007, both of which applications are incorporated herein in their entireties by this reference.

FIELD OF THE INVENTION

The present invention relates to a wireless transmission power control method, wireless transmission power control system and a secondary station for use in the system. The present invention has particular, but not exclusive, application to the third generation wireless communication system (UMTS) or 3GPP ($3^{rd}$ Generation Partnership Project).

BACKGROUND OF THE INVENTION

Under UMTS standards based on W-CDMA (W-Code Division Multiple Access) techniques, the downlink as well as the uplink dedicated physical channel (DPCH) is power controlled. In particular, from the user equipment (UE) point of view, it means that more or less power can be asked of the base or primary stations (BS) forming the fixed network in order to reach the Quality of Service (QoS) determined by the network itself. In the UMTS standard this QoS is measured in terms of the Block Error Rate (BLER) and refers to Outer Loop Power Control. In order to reach the expected QoS, the UE implements an algorithm, which translates the BLER requirement into a target SIR (Signal to Noise and Interference Ratio). This algorithm is frequently termed the target SIR algorithm. The 3GPP standard specification does not specify a method of defining the target SIR algorithm. It is left to individuals and/or manufacturers to set their own definitions.

One of the challenges in defining the target SIR algorithm is the fact that the target SIR may vary during communication, due to a variable propagation environment, variable required BLER, and/or possible reconfiguration of the Dedicated Physical Channel (DPCH). Once the target SIR has been calculated, the UE compares the SIR measured on a slot basis on the received DPCH with the target SIR. If the measured SIR is below the target SIR, the UE will require more power from the BS. Conversely, if the measured SIR is above the target SIR, the UE will signal the BS to decrease its transmitted power. This procedure is referred to as the Inner Loop Power Control.

Depending on the algorithm chosen for the target SIR, the performance of the receiver will be affected. In particular there are requirements in the UMTS standard specifying the maximum power a UE can ask and the maximum BLER allowed, as well as the convergence time to the required quality, for several propagation scenarios. Operators also have their own criteria in terms of maximum downlink power. Operators compare each UE to a reference UE and a UE unable to reach the desired quality at less or equal to the corresponding downlink power supplied to the reference UE may be rejected. An efficient target SIR algorithm is therefore needed.

Known proposals for open loop power control in third generation wireless communication systems are disclosed in US 20050243752 A1, EP 1067815 A1, US 20050099968 A1, WO 2005032011 A1, US 20050085255 A1 and GB 2408419 A1. US 20050243752 A1 discloses a target SIR which is adjusted based on a filtered scaling factor derived from a comparison of cell loading with a threshold. More particularly the target SIR is increased when the cell loading is high. EP 1067815 A1 discloses increasing a target SIR if the cell load is greater than a threshold. US 20050099968 A1 identifies that the synchronisation channel SCH is transmitted without being channel coded, that is scrambled, and may be regarded as a source of interference degrading the dedicated control channel DCCH if they overlap. In order to resolve this problem it is proposed that the target SIR be increased whenever the DCCH and SCH overlap. WO 2005032 011 A1 discloses setting of a target SIR based on frame errors in a dedicated physical data channel (DPDCH) and the field transmitted through the backward DPDCH. US 20050085255 A1 discloses setting a target SIR based on information from a number of channels. Finally, GB 2408419 A1 discloses setting the target SIR depending on the type of service provided.

Important points relating to setting the target SIR procedure are:

(1) The target SIR is in general a very long-term procedure requiring decoding of hundreds of blocks in order to have good BLER statistics before changing the target SIR value. This target SIR value is consequently very stable in time.

(2) The target SIR initial value is also important. Two approaches to setting this value can be found in the literature. In one of the two approaches a high value is set to ensure the decoding whatever the propagation conditions and in the other of the two approaches an average value, determined after analysis of the test cases provided in the standard, is set.

None of these prior proposals consider open loop power control when unloaded cell conditions prevail. Unloaded cell conditions are a realistic case in the field and a common case in Inter-operability Test (IOT). The main characteristics of unloaded cells are: low interference from other users, good Ior/Ioc (ratio between in-band received signal power and other surrounding cells interference power), SCH (Primary Synchronisation Channel (PSCH) used for slot timing and Secondary Synchronisation Channel (SSCH) used for frame synchronisation) and Primary Common Control Physical Channel (PCCPCH).

SUMMARY OF THE INVENTION

An object of the present invention is to improve the open loop power control when unloaded cell conditions prevail.

According to one aspect of the present invention there is provided a method of power control in a wireless communication system comprising a primary station and a secondary station, the primary station having means for transmitting on a downlink and the secondary station having means for receiving signals on the downlink and transmitting signals on an uplink, wherein in a loaded condition a synchronisation channel and a data channel are present and closed power control is effected by measuring the ratio of signal to interference, hereinafter referred to as SIR, in a received downlink transmission, comparing the measured SIR with a target SIR and sending a power adjust indication on the uplink to cause the primary station to adjust accordingly its transmitted power on the downlink. The method further includes the secondary station monitoring the downlink for an unloaded cell condition, and, in response to detecting an unloaded cell condition, determining a target SIR offset and applying the target SIR offset to the target SIR to increase the target SIR to overcome interference due to the presence of the SCH on the downlink.

According to a second aspect of the present invention there is provided a wireless communication system comprising a primary station and a secondary station, the primary station having means for transmitting a synchronisation channel (SCH) and a data channel on a downlink and the secondary station having means for receiving signals on the downlink and transmitting signals on an uplink, and means for effecting closed power control by measuring the ratio of signal to interference, hereinafter referred to as SIR, in a received downlink transmission, comparing the measured SIR with a target SIR and sending a power adjust indication on the uplink to cause the primary station to adjust accordingly its transmitted power on the downlink. The secondary station includes means for monitoring the downlink for an unloaded cell condition, and, in response to detecting an unloaded cell condition, for determining a target SIR offset and applying the target SIR offset to the target SIR to increase the target SIR to overcome interference due to the presence of the SCH on the downlink.

According to a third aspect of the present invention there is provided a secondary station for use in a wireless communication system comprising a primary station and a secondary station, the primary station having means for transmitting a synchronisation channel (SCH) and a data channel on a downlink and the secondary station having means for receiving signals on the downlink and transmitting signals on an uplink, and means for effecting closed power control by measuring the ratio of signal to interference, hereinafter referred to as SIR, in a received downlink transmission, comparing the measured SIR with a target SIR and sending a power adjust indication on the uplink to cause the primary station to adjust accordingly its transmitted power on the downlink. The secondary station includes means for monitoring the downlink for an unloaded cell condition, and, in response to detecting an unloaded cell condition, for determining a target SIR offset and applying the target SIR offset to the target SIR to increase the target SIR to overcome interference due to the presence of the SCH on the downlink.

The present invention is based on a recognition of the fact that in unloaded cells the important points (1) and (2) above become highly relevant. It has been observed that SCH plays a big role in BLER degradation even when propagation conditions are very good, that is, typically with negligible interference from other users and low DPCH power. The reason that SCH plays a big role is that it is not channel coded (or scrambled). In such cases, the SIR estimation by a known method based on the Dedicated Physical Control Channel (DPCCH) pilots is not always reflecting the SCH interference impact since SCH and dedicated pilots may not be transmitted at the same time in the slot. In reality the real quality of the DPCH is actually worse than indicated by the SIR estimates. This is a problem for state of the art target SIR algorithms, because it can happen that the initial SIR value is reasonably high, see the (1) above, and the SIR estimates are close to this target SIR value leading to failure to decode correctly any block. Consequently the prior art techniques are far from the required QoS without detecting it. In practice it will take hundreds of frames to be decoded before the target SIR reaches a value that fulfils the required QoS.

In the method in accordance with the present invention if unloaded cell conditions are detected, a target SIR offset is determined and applied immediately to avoid blocks of data being badly decoded. The value of the target SIR offset depends on several factors such as the general receiver performance and the current target SIR value.

BRIEF DESCRIPTION OF THE DRAWINGS

The present invention will now be described, by way of example, with reference to the accompanying drawings, wherein.

In the drawings the same reference characters have been used to indicate corresponding features.

DETAILED DESCRIPTION OF PREFERRED EMBODIMENTS

Figure 1:
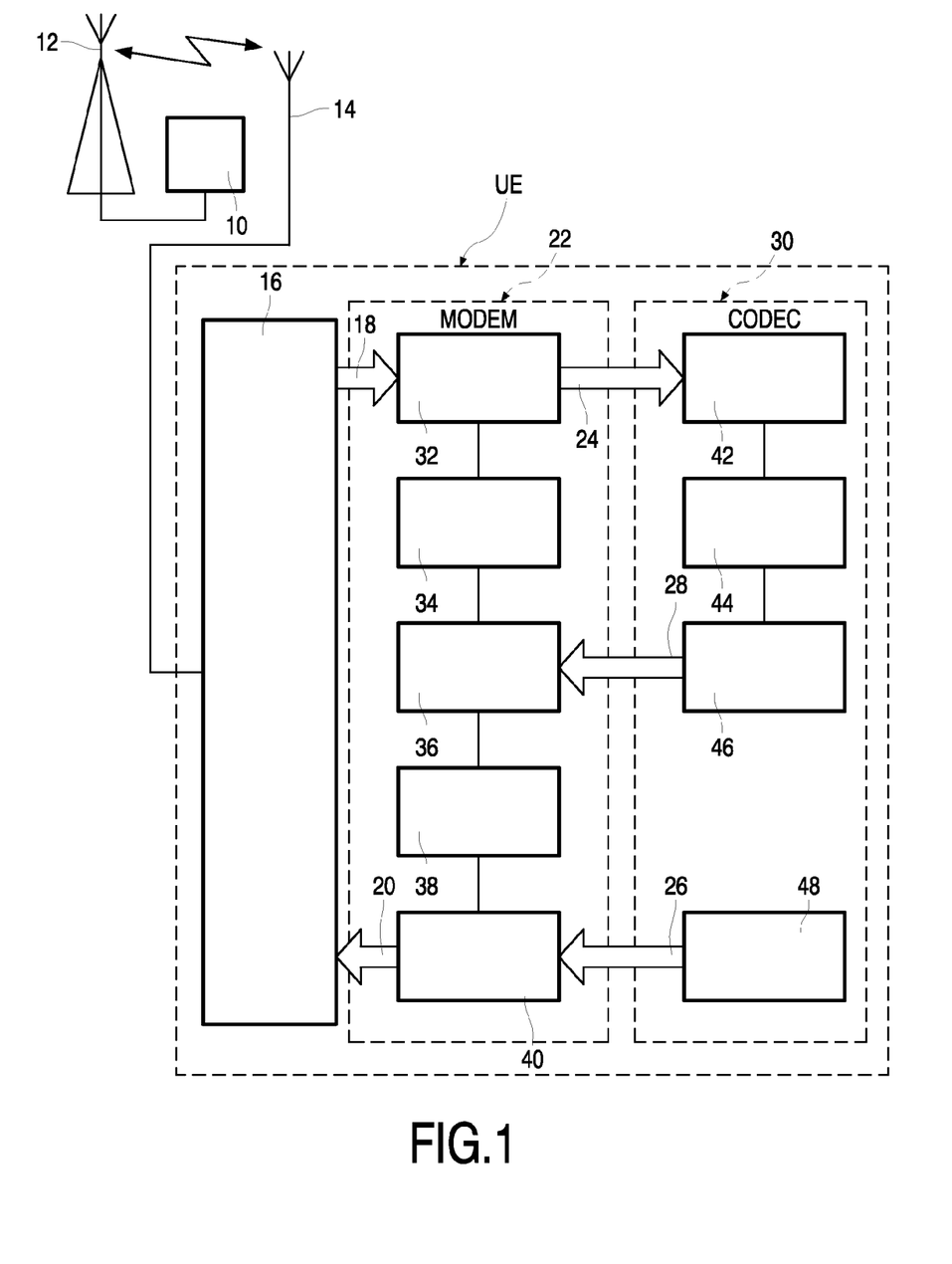
FIG. 1 is a block schematic diagram of a typical third generation wireless communication system.

Referring to FIG. 1, the illustrated typical third generation wireless communications system comprises a fixed network comprising a plurality of geographically spaced primary or base stations 10, only one of which has been shown. The primary stations may also be known as Node Bs. The primary stations 10 include wireless transceivers for communicating by way of an antenna 12 with a plurality of user equipments UE, some of which may be portable and others of which may be fixed. The communication may be in accordance with single frequency spread spectrum standard, such as W-CDMA. The primary stations 10 include equipment for applying a closed loop power control of each of the UEs in their coverage area. Power control is necessary to enable simultaneous CDMA transmissions from the UEs to be received at substantially the same power level in order to avoid near/far problems associated spread spectrum transmissions and also to cope with momentary fluctuations caused by multipath fading. In exercising closed loop power control the UE measures the signal-to-noise and interference ratio power (SIR) in a received downlink signal and compares the measured SIR with a target SIR set in the UE and, in the event of a difference, the UE implements Transmission Power Control (TPC). In 3GPP if the measured SIR is better than the target SIR a TPC bit=0 is transmitted on the uplink causing the primary station to reduce its transmission power. Alternatively if the measured SIR is inferior to the target SIR a TPC bit=1 is transmitted on the uplink to the primary station causing it to raise its transmission power.

Reverting to FIG. 1, the UE comprises an antenna 14 which is coupled to a radio unit 16. The radio unit 16 has an output 18 for coupled to an input of a modem 22 and an input coupled to an output 20 of the modem 22. The UE further includes a channel codec 30 having an input coupled to an output 24 of the modem 22, and outputs 26 and 28 coupled to respective inputs of the modem 22.

The output 18 from the radio unit 16 comprises a DPCH which is applied to a demodulating processor 32 in the modem 22. The demodulating processor 32 applies orthogonal detection and despread processing to the received DPCH to demodulate it. A receive SIR measurement unit 34 is coupled to the demodulating processor 32 in order to measure the signal to noise and interference ratio, that is the measured SIR, and supplies the result to a comparator 36 in which the measured SIR is compared with a target SIR set in the comparator 36 by the channel codec 30 by way of its output 28. The result of the comparison is supplied to a TPC bit generator 38 which, as indicated above, generates a "0" or "1" depending on whether it is necessary to signal to the primary station 10 to raise or reduce its transmitter power. The TPC bit is supplied to a modulating processor 40 which spread spectrum modulates a dedicated physical data channel DPDCH (DTCH, DCCH) and a dedicated physical control channel DPCCH (TFCI (Transport Format Combination Indicator), TPC, PILOT, FBI (Feedback Indicator)) and applies a DA conversion and quadrature modulation after spread spectrum modulation. The radio unit 16 applies processing such as frequency conversion and power amplification and then transmits the resultant signal to the primary station from the antenna 14. The primary station demodulates the TPC bits and controls the downlink transmission power in accordance with the "0", "1" logic of the TPC bits.

Owing to changes in travelling velocity during communication and changes in the propagation environment ascribable to travel, the SIR that is necessary to obtain a desired quality (the block error rate or BLER) is not constant. In order to deal with these changes, block error is observed and control is exercised to increase the target SIR if the observed value is inferior to the target BLER and decrease the target SIR if the observed value is superior to the target BLER. Control that changes the target SIR adaptively in order to achieve the desired quality is well known as open-loop transmission power control.

The open-loop power control processing is executed by the channel codec 30. The signal demodulated in the demodulating processor 32 of the modem 22 and present on the output 24 is subjected to error correcting decoding by a decoding processor 42 and then segmented into blocks TrBk. CRC error detection is subsequently carried-out on a per-TrBk basis. A receive-BLER measurement unit 44 measures the receive BLER based upon the result of error detection of each transport block TrBk and supplies the receive BLER to a comparator 46. The comparator 46 compares the receive BLER and the target BLER in terms of size, and by way of the output 28 instructs the modem 22 to raise the target SIR if the receive BLER is larger than the target BLER and to lower the target SIR if the receive BLER is smaller than the target BLER.

In open-loop power control processing, the UE decides the target SIR mainly by the BLER of the dedicated traffic channel (DTCH). Consequently, in the case where silence continues for example in a voice call, there are occasions where the BLER of the DTCH appears good and the target SIR continues to be lowered. If the Dedicated Control Channel (DCCH) is introduced into the Dedicated Physical Channel (DPCH) under these conditions, transmission power will be too low so that a UE will be unable to receive the DCCH and communication may be cut-off. This tendency becomes particularly pronounced if interfering waves are present. Accordingly it is necessary to control the target SIR so as to maintain enough quality to receive the DCCH.

Figure 2:
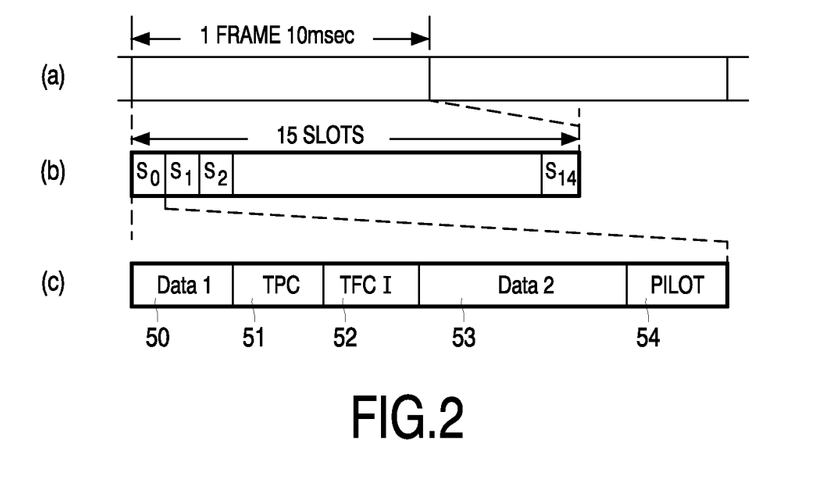
FIG. 2 illustrates an example of a frame format for a downlink DPCH.

For the sake of completeness the structure of a single DPCH frame in the downlink will be described with reference to FIG. 2. Diagram (a) of FIG. 2 illustrates that the single DPCH frame has a duration of 10 msec. Diagram (b) of FIG. 2 illustrates that each frame is composed of 15 slots $S_0$ to $S_{14}$ each having a duration of 666.7 μsec. Finally diagram (c) of FIG. 2 illustrates that the DPCH comprises five fields 50 to 54 representing respectively Data 1, TPC, TFCI, Data 2 and Pilot.

Figure 3:
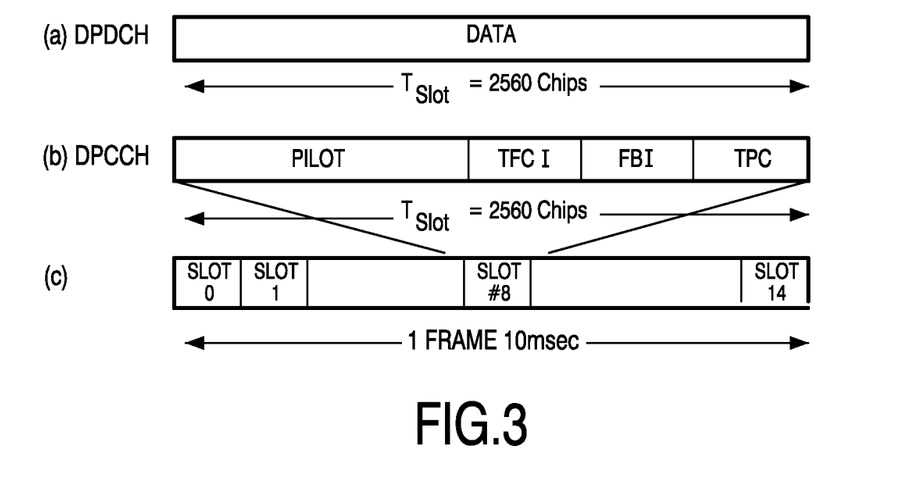
FIG. 3 illustrates an example of a frame format for an uplink DPCH.

FIG. 3, diagram (c) illustrates the composition of a single uplink frame composed of 15 slots and having a duration of 10 msec. More particularly the frame is composed of a dedicated physical data channel DPDCH, diagram (a) of FIG. 3, that transmits only transmit data and a dedicated physical control channel DPCCH, diagram (b) of FIG. 3, having fields for transmitting control data such as Pilot, TPC, TFCI and FBI (Feedback Indicator). Referring back to FIG. 1, an encoding processor 48 is provided in the channel codec 30 to spread the data on the channels DPDCH, DPCCH using an orthogonal code. The data is mapped onto a real axis (I) and an imaginary axis (Q axis) and multiplexed. The number of bits per slot of the DPDCH varies in dependence on the symbol rate but each slot of the DPCCH is fixed at 10 bits and symbol rate is fixed at 15 ksps.

Figure 4:
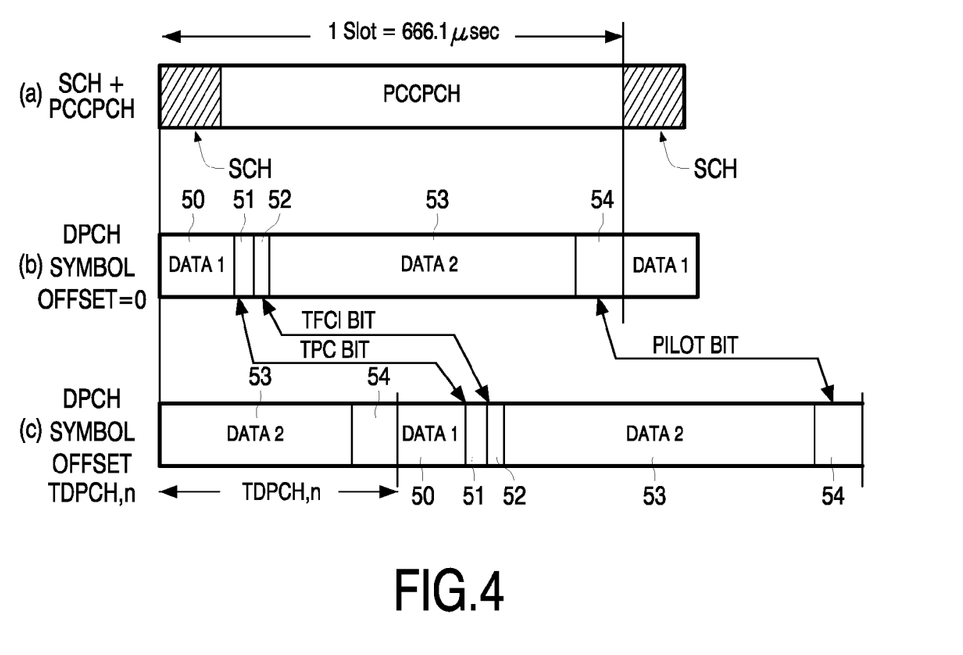
FIG. 4 illustrates examples of the positional relationship of the DPCH and the SYN.

FIG. 4 illustrates the positional relationship between SYN and DPCH. In diagram (a) of FIG. 4 SCH is a synchronisation channel for cell search and PCCPCH is a primary common control physical channel. The period of SCH+PCCPCH is one slot interval (=667 μsec) which, as shown in diagram (b) of FIG. 4, is the same as that of the dedicated physical channel DPCH. The DPCH shown in diagram (b) of FIG. 4 has a zero symbol offset with respect to SCH+PCCPCH and is composed of the fields 50 to 54 representing respectively data 1, TPC bit, TFCI bit, data 2 and pilot bit. Diagram (c) of FIG. 4 illustrates a case where the DPCH has a symbol offset of τ DPCH. It will be apparent from diagram (a) of FIG. 4 that the SCH is not transmitted continuously for the entire duration of the slot but for only $1/10^{th}$ of the duration. Accordingly the overlap between the SCH and DPCH varies. In diagram (b) of FIG. 4 the SCH overlaps the data 1 field 50 whereas in diagram (c) of FIG. 4 the SCH overlaps the data 2 field 53.

As the SCH is not scrambled, it represents an important source of interference with a cell. This interference exists irrespective of cell load. When the cell is loaded, the effect of the interference due to the presence of SCH is less visible and there is no necessity to change the algorithm for determining the target SIR value.

An example is given below of power setting at the primary station 10 (FIG. 1) for a normal loaded cell and an unloaded cell.

|  | Normal loaded cell | unloaded cell |
| --- | --- | --- |
| CPICH Ec/Ior | −10 dB | −2.5 dB |
| SCH Ec/Ior | −12 dB | −4.5 dB |
| DPCH Ec/Ior | −18 dB | −30 dB |
| OCNS/Ior (Interference from other users) | −1 dB | Negligible |

In the above table the abbreviation Ec/Ior is the value of the pilot power compared to the total channel power.

From the table it will be noted that in the unloaded cell the SCH occupies a much more important part of the received power Ior, while the DPCH is even lower. However for the unloaded cell the interference due to the SCH has a greater impact. In operation the SIR estimated on dedicated DPCCH pilot signals does not always reflect this degradation. The reason for this is that the DPCCH pilot signals on which the SIR is estimated are not always time aligned with the SCH. In this case SCH degradation is not visible on the SIR and as a result the state-of-the-art method of determining the target SIR is not efficient and the real quality of the DPCH is actually worse than indicated by the SIR estimates. It can happen that the initial target SIR value is reasonably high and as a result estimated SIR values are close to the target SIR value but no block is correctly decoded. This means that the target SIR value is far from that which will fulfill the required QoS and achieving the required QoS will take hundreds of frames.

In order to overcome this problem by the method in accordance with the present invention it necessary to be able to estimate the cell load and, in response to detecting unloaded cell conditions, to determine a target SIR offset and apply it immediately to avoid blocks of data being decoded badly. The cell load may estimated in several ways. Each of the ways is based on the common channel interference estimation. For example the common channel interference estimation can be a calculation of a power ratio between SCH power and DPCH power or an interference estimation on the Common Pilot Channel (CPICH). The determination of the target SIR offset is dependent on several factors such as the general receiver performance and the current SIR target.

The method in accordance with the present invention ensures no problem of convergence time in the initialisation phase and faster convergence to the appropriate target SIR if the cell unloads progressively during the communication. In response to a current cell being determined to be loaded or if there is a change from unloaded to loaded propagation conditions, any state of the art outer loop power control algorithm can be used.

Figure 5:
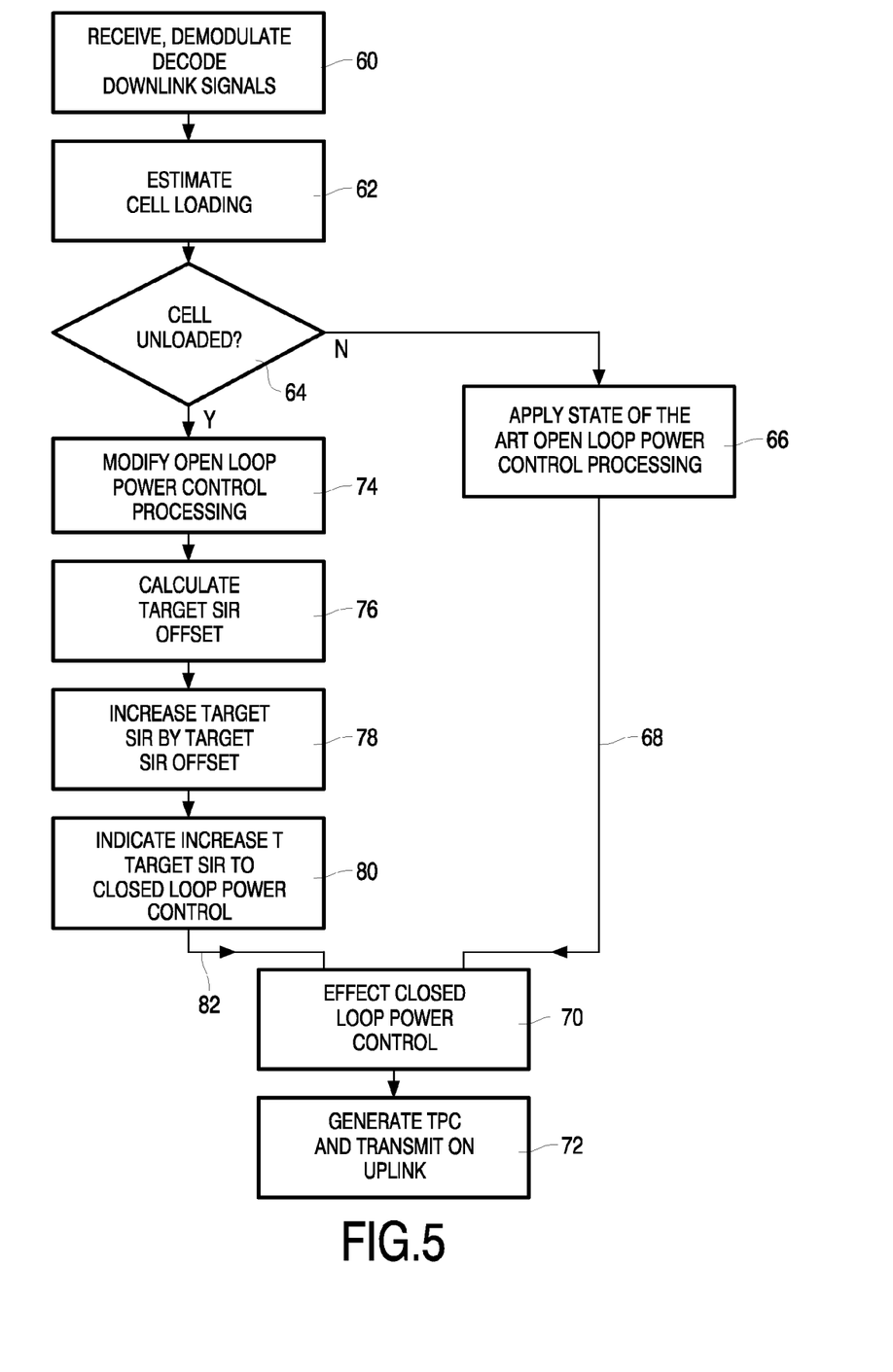
FIG. 5 is a flow chart relating to an example of implementing the method in accordance with the present invention.

FIG. 5 illustrates a flow chart for implementing an example of the method in accordance with the present invention in a UE. Block 60 indicates the operation of receiving, demodulating and decoding a downlink signal. Block 62 relates to estimating if a cell is loaded or unloaded. This may be carried-out in the receive-BLER measurement unit 44 (FIG. 1). In a decision block 64 a check is made as to whether the cell is unloaded. If it is not (N) the process continues with the block 66 which applies the state-of-the-art open loop power control processing in which a target SIR is provided on a line 68. The target SIR on the line 68 is applied to the block 70 which relates to effecting closed loop power control. In a block 72 a TPC is generated and is transmitted to the primary station 10 (FIG. 1).

If the decision in the block 64 is that the cell is unloaded (Y) then in block 74 a modified open loop power control processing is implemented. In block 76 a target SIR offset is calculated. In block 78 the target SIR is increased temporarily by combining the target SIR offset with the current target SIR. In block 80 the temporarily increased target SIR is applied by line 82 closed loop power control block 72.

In the present specification and claims the word "a" or "an" preceding an element does not exclude the presence of a plurality of such elements. Further, the word "comprising" does not exclude the presence of other elements or steps than those listed.

The use of any reference signs placed between parentheses in the claims shall not be construed as limiting the scope of the claims.

From reading the present disclosure, other modifications will be apparent to persons skilled in the art. Such modifications may involve other features which are already known in the design, manufacture and use of wireless transmission power control systems and component parts therefor and which may be used instead of or in addition to features already described herein.

The invention claimed is:

1. A method of power control in a wireless communication system comprising a primary station and a secondary station, the primary station configured for transmitting on a downlink and the secondary station configured for receiving signals on the downlink and transmitting signals on an uplink, wherein a synchronization channel and a data channel are present on the downlink and closed loop power control is effected by measuring a signal to interference ratio (SIR) in a received downlink transmission, comparing the measured SIR with a target SIR and sending a power adjust indication on the uplink to cause the primary station to adjust accordingly its transmitted power on the downlink, and wherein in an unloaded cell at least one common channel occupies an increased part of the received power in comparison to in a loaded cell, the method comprising in the secondary station:

monitoring the downlink for an unloaded cell condition by estimating if a cell is loaded or unloaded based on estimation of interference due to the at least one common channel;

in response to detecting the unloaded cell condition, determining a target SIR offset; and applying the target SIR offset to the target SIR to increase the target SIR to overcome interference due to the presence of the synchronization channel during the unloaded cell condition on the downlink.

2. A method as claimed in claim 1, wherein the value of the target SIR offset is determined having regard to the receiver performance and a current target SIR value.

3. A method as claimed in claim 1, wherein loading/unloading of a cell is determined by calculating a power ratio between the synchronization channel and the data channel.

4. A method as claimed in claim 1, wherein loading/unloading of a cell is determined by estimating interference on a Common Pilot Channel.

5. A wireless communication system comprising:

a primary station configured for transmitting a synchronization channel and a data channel on a downlink; and a secondary station configured:

for receiving signals on the downlink and transmitting signals on an uplink, for effecting closed loop power control by measuring a signal to interference ratio (SIR) in a received downlink transmission, for comparing the measured SIR with a target SIR and sending a power adjust indication on the uplink to cause the primary station to adjust accordingly its transmitted power on the downlink, and for monitoring the downlink for an unloaded cell condition by estimating if a cell is loaded or unloaded based on estimation of interference due to at least one common channel, and, in response to detecting the unloaded cell condition, for determining a target SIR offset and applying the target SIR offset to the target SIR to increase the target SIR to overcome interference due to the presence of the synchronization channel during the unloaded cell condition on the downlink, and wherein in an unloaded cell the at least one common channel occupies an increased part of the received power in comparison to a loaded cell.

6. A system as claimed in claim 5, configured for determining the value of the target SIR offset having regard to the performance of receiving the downlink signals and a current target SIR value.

7. A system as claimed in claim 5, comprising a cell load estimator configured for determining the loading/unloading of a cell by calculating a power ratio between the synchronization channel and the data channel.

8. A system as claimed in claim 5, comprising a cell load estimator configured for determining the loading/unloading of a cell by estimating interference on a Common Pilot Channel.

9. A secondary station for use in a wireless communication system comprising a primary station and a secondary station, the primary station configured for transmitting a synchronization channel and a data channel on a downlink and the secondary station configured:
   for receiving signals on the downlink and transmitting signals on an uplink,
   for effecting closed loop power control by measuring a signal to interference ratio (SIR) in a received downlink transmission,
   for comparing the measured SIR with a target SIR and sending a power adjust indication on the uplink to cause the primary station to adjust accordingly its transmitted power on the downlink, and
   for monitoring the downlink for an unloaded cell condition by estimating if a cell is loaded or unloaded based on estimation of interference due to at least one common channel, and,
   in response to detecting the unloaded cell condition, for determining a target SIR offset and applying the target SIR offset to the target SIR to increase the target SIR to overcome interference due to the presence of the synchronization channel during the unloaded cell condition on the downlink, and
   wherein in an unloaded cell the at least one common channel occupies an increased part of the received power in comparison to a loaded cell.

10. A secondary station as claimed in claim 9, configured for determining the value of the target SIR offset having regard to the performance of receiving the downlink signals and a current target SIR value.

11. A secondary station as claimed in claim 9, comprising a cell load estimator for determining the loading/unloading of a cell by calculating a power ratio between the synchronization channel and the data channel.

12. A secondary station as claimed in claim 9, comprising a cell load estimator for determining loading/unloading of a cell by estimating interference on a Common Pilot Channel.

13. A method of power control in a wireless communication system comprising a primary station and a secondary station, the primary station having a transmitter for transmitting on a downlink and the secondary station having a radio unit for receiving signals on the downlink and transmitting signals on an uplink, wherein a synchronization channel and a data channel are present on the downlink and closed loop power control is effected by measuring a signal to interference ratio (SIR) in a received downlink transmission, comparing the measured SIR with a target SIR and sending a power adjust indication TPC on the uplink to cause the primary station to adjust accordingly its transmitted power on the downlink, the method comprising in the secondary station:
   monitoring the downlink for an unloaded cell condition by estimating if a cell is loaded or unloaded based on estimation of interference due to at least one common channel;
   in response to detecting the unloaded cell condition, determining a target SIR offset; and
   applying the target SIR offset to the target SIR to increase the target SIR to overcome interference due to the presence of the synchronization channel during the unloaded cell condition on the downlink, and
   wherein in an unloaded cell the at least one common channel occupies an increased part of the received power in comparison to a loaded cell.

14. A method as claimed in claim 13, wherein the value of the target SIR offset is determined having regard to the receiver performance and a current target SIR value.

15. A method as claimed in claim 13, wherein loading/unloading of a cell is determined by calculating a power ratio between the synchronization channel and the data channel.

16. A method as claimed in claim 13, wherein loading/unloading of a cell is determined by estimating interference on a Common Pilot Channel.

17. A secondary station for use in a wireless communication system comprising a primary station including a transceiver for transmitting a synchronization channel and a data channel on a downlink, the secondary station comprising:
   a radio unit for receiving signals on the downlink and transmitting signals on an uplink;
   a receive signal to interference ratio (SIR) measurement unit for measuring a SIR in a received downlink transmission;
   a comparator for comparing the measured SIR with a target SIR; and
   a receive block error rate measurement unit for monitoring the downlink for an unloaded cell condition by estimating if a cell is loaded or unloaded based on estimation of interference due to at least one common channel, and,
   in response to detecting the unloaded cell condition, for determining a target SIR offset and applying the target SIR offset to the target SIR to increase the target SIR to overcome interference due to the presence of the synchronization channel during the unloaded cell condition on the downlink, and
   wherein in an unloaded cell the at least one common channel occupies an increased part of the received power in comparison to a loaded cell.

18. A secondary station as claimed in claim 17 further comprising:
   a cell load estimator for determining the loading/unloading of a cell by calculating a power ratio between the synchronization channel and the data channel.

19. A secondary station as claimed in claim 17 further comprising:
   a cell load estimator for determining loading/unloading of a cell by estimating interference on a Common Pilot Channel.

20. A method of power control in a wireless communication system comprising a primary station and a secondary station, the primary station configured for transmitting on a downlink and the secondary station configured for receiving signals on the downlink and transmitting signals on an uplink, wherein in a loaded condition a synchronization channel and a data channel are present on the downlink and closed loop power control is effected by measuring a signal to interference ratio (SIR) in a received downlink transmission, comparing the measured SIR with a target SIR and sending a power adjust indication on the uplink to cause the primary station to adjust accordingly its transmitted power on the downlink, the method comprising in the secondary station:
   monitoring the downlink by the secondary station for an unloaded cell condition by estimating if a cell is loaded or unloaded based on estimation of the part of the received power occupied by at least one common channel;
   in response to detecting the unloaded cell condition, determining a target SIR offset; and
   applying the target SIR offset to the target SIR to increase the target SIR to overcome interference due to the presence of the synchronization channel during the unloaded cell condition on the downlink.

21. A method of power control in a wireless communication system comprising a primary station and a secondary station, the primary station configured for transmitting on a downlink and the secondary station configured for receiving signals on the downlink and transmitting signals on an uplink, wherein in a loaded condition a synchronization channel and a data channel are present on the downlink and closed loop power control is effected by measuring a signal to interference ratio (SIR) in a received downlink transmission, comparing the measured SIR with a target SIR and sending a power adjust indication on the uplink to cause the primary station to adjust accordingly its transmitted power on the downlink, the method comprising in the secondary station:

> monitoring the downlink by the secondary station for an unloaded cell condition by estimating if a cell is loaded or unloaded based on estimation of the part of the received power occupied by one of the synchronization channel and a common pilot channel;
> 
> in response to detecting the unloaded cell condition, determining a target SIR offset; and
> 
> applying the target SIR offset to the target SIR to increase the target SIR to overcome interference due to the presence of the synchronization channel during the unloaded cell condition on the downlink.

* * * * *